July 1, 1930.  F. MAGIDSON  1,769,885
FASTENER FOR PIN TICKETS
Filed April 5, 1928
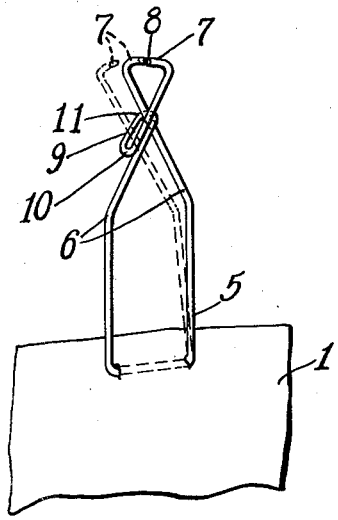
INVENTOR.
Frank Magidson
BY: Green & McCallister
His ATTORNEYS.

Patented July 1, 1930

1,769,885

UNITED STATES PATENT OFFICE

FRANK MAGIDSON, OF PITTSBURGH, PENNSYLVANIA, ASSIGNOR TO PITTSBURGH TAG COMPANY, OF PITTSBURGH, PENNSYLVANIA, A CORPORATION OF PENNSYLVANIA

FASTENER FOR PIN TICKETS

Application filed April 5, 1928. Serial No. 267,612.

This invention relates to fasteners such for example, as those employed in temporarily attaching tags or the like to various articles for identification purposes.

An object of this invention is to provide an improved fastener of the type set forth constructed and arranged to securely attach itself to the article without any danger of damage to the article.

A further object is to provide a fastener which can be easily and cheaply formed from a single piece of wire.

A further object is to provide a fastener for attaching tags to articles which will be cheap to manufacture and which can be easily and quickly attached to or detached from an associated article.

These and other objects, which will be apparent to those skilled in this particular art, are accomplished by means of the invention disclosed in the acompanying drawing which is a perspective view of a fastener constructed in accordance with one embodiment of this invention.

The particular embodiments of the present invention which have been chosen for the purposes of illustration are shown in connection with a tag 1 or the like which it is desired to secure to an article. The fastener is formed from a single piece of wire and in the form shown in Fig. 1, the wire is bent to form a loop 5 on which the tag or similar device is mounted. The legs 6 of the loop are bent obliquely toward and project past each other and the outer ends 7 of the legs are bent back toward each other and sharpened at their ends to form co-operating article-piercing points 8. One leg 6 is so shaped as to form a loop 9 surrounding the other leg and providing a means for guiding and limiting the movement thereof with relation to the first leg.

It will be apparent that the loop 9 not only serves to maintain the legs 6 in cooperative relation but also serves to limit the relative movement of the piercing points or teeth 8 in each direction. The outer bend 10 of the loop serves to prevent bending of the leg 5 beyond the elastic limit of the material when applying the fastener to an article. The opposite end 11 of the loop limits the movement of the points or teeth toward one another; said movement being due to the spring of the wire. The loop properly positions the points or teeth in operative, article-securing relationship.

The loop 9 also prevents any sidewise movement of the article-engaging points or teeth 8 away from one another and thus prevents the cloth or other material from being disengaged from the fastener as a result of any twisting of the fastener relatively thereto. It will be observed that the coil 9 lies at the same angle as the oblique part of the leg 6 from which the coil is formed; by this arrangement, a coil of sufficient length is made possible without extending it laterally far enough to be in the way, as would be the case were the coil extended laterally at right angles to the longitudinal center of the clip.

The opposite legs 6 of the device form, in effect, finger holds, by means of which the teeth 8 can be separated by pressing such surfaces and moving and separating the teeth as indicated in dotted lines in the drawing. This movement of the teeth is guided by the loop 9 and the spring of the wire causes the teeth to penetrate the article and secure the fastener thereto when the finger holds are released. It will be observed that it is important that the guiding and limiting loop 9 shall be located adjacent to the article-engaging fingers 7—i. e., between the grasping-portion of the device and the article-holding fingers—so as to thereby avoid all danger of sidewisely separating the fingers while the fingers are in engagement with the article, thus insuring against accidental disconnection of the tag from the article. In this way also I avoid forming interlocking hooks on the ends of the fingers. It is desirable also that the side arms of the loop 5 shall be approximately parallel in order that they may be conveniently pressed toward each other by the fingers in the operation of attaching or detaching the tag. This, of course, does not mean that these arms cannot be more or less curved.

What I claim as new and desire to secure by Letters Patent is:—

1. A fastener formed from a single piece of wire bent upon itself to provide two legs which lie substantially parallel throughout a portion of their length and which are bent so as to cross one another, one leg being bent around the other to form a closed guiding and retaining loop, the ends of said legs being bent toward one another adjacent said loop to provide engaging jaws.

2. A fastener formed from a single piece of wire bent upon itself to provide two legs which lie substantially parallel throughout a portion of their length and which are bent so as to cross one another, one leg being bent around the other to form a closed guiding and retaining loop, the ends of said legs being bent toward one another adjacent said loop and being provided with article engaging points.

3. A fastener formed from a single piece of wire bent upon itself to provide two legs which are spaced throughout a portion of their length and which are bent so as to cross one another, one leg being bent around the other to form a closed relatively flat guiding and retaining loop, the ends of said legs being bent toward one another adjacent said loop to provide engaging jaws.

4. A fastener formed from a single piece of wire bent upon itself to provide two legs which lie substantially parallel throughout a portion of their length and which are bent so as to cross one another, one leg being bent around the other into the form of a closed relatively flat guiding and limiting loop, the ends of said legs being bent toward one another adjacent said loop and being provided with article engaging points.

5. A fastener formed from a single piece of wire bent upon itself to provide two legs which lie substantially parallel throughout a portion of their length and which are bent so as to cross one another, one leg being bent around the other to form a closed relatively narrow loop, the ends of said legs being bent backward toward one another adjacent said loop.

6. A fastener formed from a single piece of wire bent upon itself to provide two legs which lie substantially parallel throughout a portion of their length and which are bent so as to cross one another, one leg being bent around the other to form an elongated guiding and retaining loop, the ends of the said legs being bent backward toward one another adjacent said loop, to form engaging jaws, said loop being but little wider than the diameter of the wire and serving to limit the closing movement of the jaws.

7. A fastener formed from a single piece of wire bent upon itself to provide two legs which lie substantially parallel throughout a portion of their length and which are bent so as to cross one another adjacent one end of the fastener, one leg being bent around the other to form an elongated relatively flat guiding and retaining loop, the ends of said legs being bent backward toward one another adjacent said loop and being provided with article engaging points.

8. A fastener formed from a single piece of wire bent upon itself to form two legs which are substantially parallel throughout at least one half of their length and which are bent obliquely so as to cross one another adjacent one end of the fastener, one leg being bent around the other to form a narrow closed loop for guiding and limiting the movements of the fastener, the outer ends of said legs being bent backwardly toward one another and being provided with article engaging points, said loop lying obliquely in alignment with the oblique part of the leg from which it is formed and being located adjacent said article engaging points.

In testimony whereof, I have hereunto subscribed my name this 2nd day of April, 1928.

FRANK MAGIDSON.